(12) United States Patent
Hong et al.

(10) Patent No.: US 11,196,100 B2
(45) Date of Patent: Dec. 7, 2021

(54) APPARATUS AND METHOD FOR COLLECTING GAS

(71) Applicant: LG Chem, Ltd., Seoul (KR)

(72) Inventors: Sungwon Hong, Daejeon (KR); Jeong Ae Ahn, Daejeon (KR); Ju Yong Lee, Daejeon (KR); Kyungmee Lee, Daejeon (KR); Junghyun Song, Daejeon (KR); Nak Hee Choi, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/766,782

(22) PCT Filed: Jul. 3, 2019

(86) PCT No.: PCT/KR2019/008091
§ 371 (c)(1),
(2) Date: May 26, 2020

(87) PCT Pub. No.: WO2020/009451
PCT Pub. Date: Jan. 9, 2020

(65) Prior Publication Data
US 2020/0303786 A1 Sep. 24, 2020

(30) Foreign Application Priority Data

Jul. 4, 2018 (KR) .................. 10-2018-0077665
May 15, 2019 (KR) .................. 10-2019-0056805
Jun. 25, 2019 (KR) .................. 10-2019-0075688

(51) Int. Cl.
*H01M 10/42* (2006.01)
*G01N 1/22* (2006.01)
(Continued)

(52) U.S. Cl.
CPC .......... *H01M 10/4285* (2013.01); *G01N 1/22* (2013.01); *H01M 10/48* (2013.01); *H01M 50/20* (2021.01)

(58) Field of Classification Search
CPC .. H01M 10/4285; H01M 10/48; H01M 50/20; H01M 50/30; H01M 10/52;
(Continued)

(56) References Cited

U.S. PATENT DOCUMENTS 9,553,290 B2 * 1/2017 Nagano ............... H01M 50/394
2020/0176833 A1 * 6/2020 Hwang ................ H01M 50/30

FOREIGN PATENT DOCUMENTS

JP    2000090958 A    3/2000
JP    2001332312 A    11/2001
(Continued)

OTHER PUBLICATIONS

Extended European Search Report including Written Opinion dated Jan. 26, 2021 for Application No. 19830675.5, 6 pages.
(Continued)

*Primary Examiner* — Melissa J Koval
*Assistant Examiner* — Trung Q Nguyen
(74) *Attorney, Agent, or Firm* — Lerner, David, Littenberg, Krumholz & Mentlik, LLP (57) ABSTRACT

An apparatus for automatically collecting gas generated in a secondary battery which is being developed as an energy source for vehicle battery cells, mobile devices, power tools, etc., and automatically injecting the gas into an analysis apparatus so that the gas can be analyzed. The automated apparatus includes a plurality of battery holders in which a plurality of secondary batteries are capable of being mounted, respectively, a battery holder tray in which the plurality of battery holders are placed, a collecting unit which moves in the direction perpendicular to the surface of
(Continued)

a secondary battery to be analyzed among the plurality of secondary batteries; and a punching unit which moves in the direction perpendicular to the surface of the secondary battery to punch the surface of the secondary battery The battery holder tray is capable of rotating such that the surface of the secondary battery can face the collecting unit.

10 Claims, 5 Drawing Sheets

(51) Int. Cl.
*H01M 10/48* (2006.01)
*H01M 50/20* (2021.01)

(58) Field of Classification Search
CPC ......... H01M 10/4207; H01M 10/4235; H01M 50/308; G01N 1/22; Y02E 60/10; B60L 1/14; B60L 3/12
USPC ... 324/207.13–207.15, 200, 86, 167, 207.25, 324/654, 76.75, 76.11, 500, 750.16, 220
See application file for complete search history.

(56) References Cited

FOREIGN PATENT DOCUMENTS

| | | | | | |
|---|---|---|---|---|---|
| JP | 2010231963 | A | | 10/2010 | |
| JP | 2011003513 | A | | 1/2011 | |
| JP | 2011192523 | A | | 9/2011 | |
| JP | 2017181212 | A | | 10/2017 | |
| JP | 2018041740 | A | | 3/2018 | |
| KR | 101590395 | B1 | | 2/2016 | |
| KR | 20160045377 | A | | 4/2016 | |
| KR | 101634310 | B1 | | 7/2016 | |
| KR | 2016-0045377 | A | * | 9/2016 | ............. C22B 15/00 |
| KR | 20170083214 | A | | 7/2017 | |
| KR | 2018-0047274 | A | * | 5/2018 | ............. Y02E 60/10 |
| KR | 20180047274 | A | | 5/2018 | |
| KR | 20180047280 | A | | 5/2018 | |

OTHER PUBLICATIONS

International Search Report from Application No. PCT/KR2019/008091 dated Oct. 11, 2019, 2 pages.

* cited by examiner

PRIOR ART

APPARATUS AND METHOD FOR COLLECTING GAS

CROSS-REFERENCE TO RELATED APPLICATIONS

The present application is a national phase entry under 35 U.S.C. § 371 of International Application No. PCT/KR2019/008091 filed Jul. 3, 2019, published in Korean, which claims priority from Korean Patent Application Nos. 10-2018-0077665 filed Jul. 4, 2018; 10-2019-0056805 filed May 15, 2019; and 10-2019-0075688 filed Jun. 25, 2019, all of which are incorporated herein by reference.

BACKGROUND OF THE INVENTION

1. Field of the Invention

The present invention relates to a gas collecting device and method, and more particularly, to a gas collecting and analyzing device and method of inner gas generated from a plurality of secondary batteries by using an automated collecting device of inner gas generated in a secondary battery.

2. Description of the Related Art

In general, a secondary battery is a battery that can be repeatedly used through a discharge process of converting chemical energy into electrical energy and a charging process in the reverse direction thereof. The types thereof include nickel-cadmium (Ni—Cd) batteries and nickel-hydrogen (Ni-MH) batteries, lithium-metal batteries, lithium-ion (Li-ion) batteries, and lithium-ion polymer batteries (Li-ion Polymer Battery). Among these secondary batteries, lithium secondary batteries having high energy density and voltage, long cycle life, and low self discharge rate are commercially used and widely used. Lithium secondary batteries include polymer type batteries, circular type batteries, square type batteries, and pouch type batteries.

However, the conventional lithium secondary battery has a risk of ignition/explosion when exposed to high temperatures. In addition, when a large current flows within a short time due to overcharge, external short circuit, nail penetration, local crush, or the like, there is a risk of ignition/explosion while the battery is heated by infrared (IR) heating. As an example, as a result of the reaction between electrolyte and electrodes, gas is generated to increase internal pressure of the battery, and the lithium secondary battery may explode or vent the gas at a pressure equal to or greater than a predetermined pressure.

Various kinds of gases, such as hydrogen, oxygen, nitrogen, carbon monoxide, carbon dioxide, hydrocarbon such as $C_nH_{2n-2}$ (n=2~5), $C_nH_{2n}$ (n=2~5) and $C_nH_{2n+2}$ (n=1~5) and other organic gas species may be generated depending on the reaction in a lithium secondary battery. Internally generated gases, such as carbon dioxide, are reversible depending on the conditions, returning back to their original material upon charging, but usually remain in a gaseous phase in the battery to increase internal pressure and cause a swelling phenomenon that causes the battery to swell. The battery having a swelling phenomenon is too thick to be mounted on an electric and electronic device that is designed to be mounted, or it is judged to be defective because of a bulging appearance and loses its value as a product.

Therefore, it is very important to collect and accurately analyze the gas generated in the secondary battery. Various gases are generated during the operation of lithium ion batteries, and information on the composition and content of the generated gases is useful for developing battery materials, optimizing battery manufacturing processes, and identifying causes of battery failure.

Figure 1:
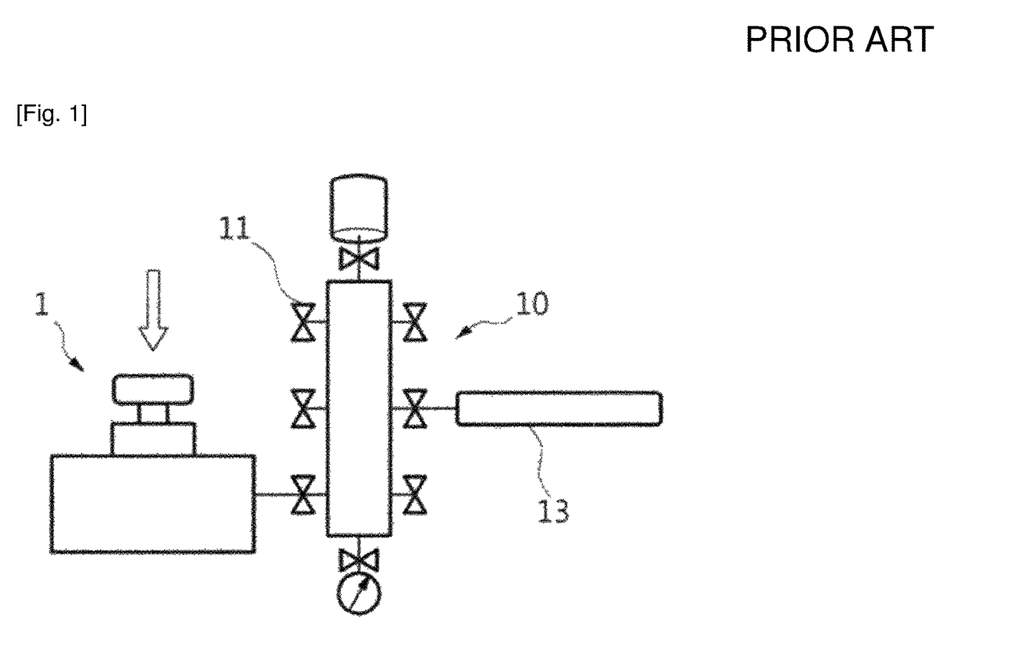
FIG. 1 is a schematic diagram of a conventional collecting device of gas generated in the secondary battery.

First, FIG. 1 shows a conventional collecting device 1 of gas generated in the secondary battery which is connected to a manifold part 10. Referring to FIG. 1, the conventional collecting device 1 of gas generated in the secondary battery collects gas by only one secondary battery mounted in a jig of the collecting device 1 of gas generated in the secondary battery 1 for analysis of inner gas of the secondary battery. As a result, the gas is analyzed through a gas analyzer 13 connected to the manifold part 10.

That is, a vacuum pump 11 of the manifold part 10 is connected to a predetermined position of the collecting device 100 of gas generated in the secondary battery, to adjust the collecting device of inner gas generated in the secondary battery equipped with the secondary battery to a vacuum state. Subsequently, the secondary battery is punched through a punching unit to collect gas and then the gas is analyzed through the gas analyzer 13.

The gas analyzer 13 uses a mass spectrometer or chromatography, but is not limited thereto, and other analyzers or methods may be used to increase the accuracy or precision of gas analysis.

However, the conventional method for collecting the generated gas in the battery uses a method in which one type of battery is placed in a sealed jig and punched manually to collect gas. Therefore, there is a need for a device that can more efficiently and quickly collect the gas generated from a larger number of batteries.

SUMMARY OF THE INVENTION

The present invention is devised to solve the above problems of the prior art. The present invention is to provide a device for automatically collecting gas generated in the secondary battery that has been developed as an energy source of automotive battery mobile devices and power tools, for example, wherein the device automatically collects the gas generated in a plurality of secondary batteries and automatically injects it into an analysis device for analyzing.

The automated gas-collecting device comprises each holder being configured to hold a corresponding secondary battery mounted therein; a battery holder tray configured to support the plurality of battery holders; a collecting unit configured to removeably affix to a surface of a secondary battery mounted in one of the plurality of battery holders by moving in a direction perpendicular to the surface of the secondary battery; and a punching unit configured to punch a side of the secondary battery affixed to the collecting unit by moving in a direction perpendicular to the surface of the secondary battery, wherein the battery holder tray is configured to rotate to position the surface of the secondary battery facing the collecting unit.

A method performed by an automated gas-collecting device may comprise rotating the battery holder tray to move the secondary battery to a position facing the collecting unit; affixing the collecting unit to the surface of the secondary battery; adjusting an interior of the collecting unit to a vacuum state; punching the surface of the secondary battery with the punching unit; collecting gas generated in the secondary battery; separating the secondary battery from the collecting unit by injecting nitrogen gas; spacing the collecting unit apart from the secondary battery; and moving a next secondary battery to the position facing the collecting unit.

The method may comprise rotating the battery holder tray by a rotor connected to a first cylinder to move the secondary battery to a position facing the collecting unit using rotational power provided by the first cylinder; moving the collecting unit toward the surface of the secondary battery using linear power provided by a second cylinder; adjusting an interior of the collecting unit to a vacuum state; punching the surface of the secondary battery with the punching unit by linearly moving the punching unit by a crank connected to a third cylinder using rotational power provided by the third cylinder; collecting gas generated in the secondary battery; separating the secondary battery from the collecting unit by injecting nitrogen gas; spacing the collecting unit apart from the secondary battery using linear power provided by the second cylinder; and rotating the battery holder tray by the rotor to allow a next secondary battery to face the collecting unit.

EFFECT OF THE INVENTION

According to the present invention, even with one automated collecting device of gas generated in a secondary battery, it is possible to collect and analyze more efficiently, simply and quickly, in collecting gas generated from a plurality of secondary batteries and analyzing the gas in real time.

DETAILED DESCRIPTION OF THE INVENTION

The automated collecting device of gas generated in a secondary battery comprises a plurality of battery holders, each of which is mounted with each of a plurality of secondary batteries; a battery holder tray in which the plurality of battery holders are placed; a collecting unit for coupling to and decoupling from one surface of the secondary battery to be analyzed by moving in a direction perpendicular to the one surface of the secondary battery to be analyzed among the plurality of secondary batteries; and a punching unit for punching the one side of the secondary battery fixed to the collecting unit by moving in a direction perpendicular to the one surface of the secondary battery to be analyzed in the collecting unit, wherein the battery holder tray may rotate to allow the one surface of the secondary battery to face the collecting unit.

The automated collecting device of gas generated in a secondary battery of the present invention further comprises a second cylinder connected to the collecting unit and providing power for linear movement; a rotor connected to the battery holder tray to rotate the battery holder tray; a first cylinder connected to the rotor and providing rotational power; a crank connected to the punching unit; and a third cylinder connected to the crank and providing rotational power, wherein the crank converts the rotational power of the third cylinder into power for linear movement of the punching unit.

In the automated collecting device of gas generated in a secondary battery of the present invention, the collecting unit may be positioned above the battery holder tray, and the secondary battery or the battery holder may be positioned between the collecting unit and the battery holder tray.

In the automated collecting device of gas generated in a secondary battery of the present invention, the collecting unit may comprise a battery holder accommodating unit positioned at a lower end of the collecting unit, the battery holder accommodating unit for accommodating battery holder in its inner space; an accommodating unit of gas generated in the battery which is integrally formed with the battery holder accommodating unit over the battery holder accommodating unit and has a columnar shape, the accommodating unit of gas generated in the battery for accommodating the gas generated in the secondary battery in its inner space; a sealing member provided at a portion where the battery holder accommodating unit and the one surface of the secondary battery contact each other, the sealing member for sealing a space formed by the accommodating unit of gas generated in the battery and the one surface of the secondary battery; an outlet of gas generated in the battery provided at a lateral side of the accommodating unit of gas generated in the battery, wherein the outlet of gas generated in the battery is adjusted to move the inner gas generated in the secondary battery which is released through the accommodating unit of gas generated in the battery from the one surface of the secondary battery to a manifold part or a gas analyzer; and a vacuum pump connecting part provided at a lateral side of the accommodating unit of gas generated in the battery and adjusted to connect to a vacuum pump.

In the automated collecting device of gas generated in a secondary battery of the present invention, the punching unit may comprise a punching unit rod connected to the crank; and a punching needle connected to a lower end of the punching unit rod, wherein the punching needle moves through the accommodating unit of gas generated in the battery by movement of the punching unit rod due to rotation of the crank, and the punching needle punches the one surface of the secondary battery.

In the automated collecting device of gas generated in a secondary battery of the present invention, the punching unit may further comprise a spring connected to an upper end of the punching unit rod, wherein when the crank rotates to move the punching needle downward, the one surface of the secondary battery is punched by moving the punching needle at a high speed with a restoring force of the contracted spring.

In the automated collecting device of gas generated in a secondary battery of the present invention, the secondary battery may be any one of a cylinder type battery, a square type battery, a coin cell battery and a pouch type battery.

In the automated collecting device of gas generated in a secondary battery of the present invention, the collecting unit may further comprise a nitrogen gas connecting part provided at a lateral side of the accommodating unit of gas generated in the battery and adjusted to connect a nitrogen gas supplying part.

In the automated collecting device of gas generated in a secondary battery of the present invention, when the collection of the inner gas generated in the secondary battery to be analyzed is completed, the collecting unit is spaced apart from the one surface of the secondary battery to decouple from the one surface of the secondary battery and the battery holder tray rotates to allow one surface of the secondary battery to be analyzed next to face the collecting unit.

The automated collecting method of the gas generated in the secondary battery of the present invention may be performed in the automated collecting device of gas generated in the secondary battery of the present invention.

The automated collecting method of gas generated in a secondary battery of the present invention may comprise the steps of rotating the battery holder tray to move a secondary battery to be analyzed to a position facing the collecting unit; approaching the collecting unit to the one surface of the secondary battery to couple; adjusting an interior of the collecting unit to a vacuum state; punching the one surface of the secondary battery with the punching unit; collecting the gas generated in the secondary battery; separating the secondary battery from the collecting unit by injecting nitrogen gas; and spacing the collecting unit apart from the secondary battery and moving a secondary battery to be analyzed next to the position facing the collecting unit.

The automated collecting method of gas generated in a secondary battery of the present invention may comprise the steps of rotating the battery holder tray by a rotor connected to a first cylinder to move the secondary battery to be analyzed to a position facing the collecting unit, with rotational power of the first cylinder; approaching the collecting unit to the one surface of the secondary battery to couple, with linear power of a second cylinder; adjusting an interior of the collecting unit to a vacuum state; punching the one surface of the secondary battery with the punching unit by linearly moving the punching unit by a crank connected to a third cylinder, with rotational power of the third cylinder; collecting inner gas generated in the secondary battery; separating the secondary battery from the collecting unit by injecting nitrogen gas; and spacing the collecting unit apart from the secondary battery with linear power of the second cylinder and rotating the battery holder tray by the rotor to allow a secondary battery to be analyzed next to face the collecting unit.

The terms or words used in this specification and claims are not to be limited to the ordinary or dictionary meanings, and should be interpreted as meanings and concepts corresponding to the technical spirit of the present invention based on the principle that the inventor can appropriately define the concepts of the terms to best describe his own invention. Therefore, since the embodiments described in the specification and the drawings shown in the drawings are only the most preferred embodiments of the present invention and do not represent all of the technical idea of the present invention, it should be understood that there may be equivalents and variations that may be substituted for them at the time of the present application. In addition, detailed descriptions of well-known functions and configurations that may unnecessarily obscure the subject matter of the present invention will be omitted. Hereinafter, exemplary embodiments of the present invention will be described in detail with reference to the accompanying drawings.

Figure 2:
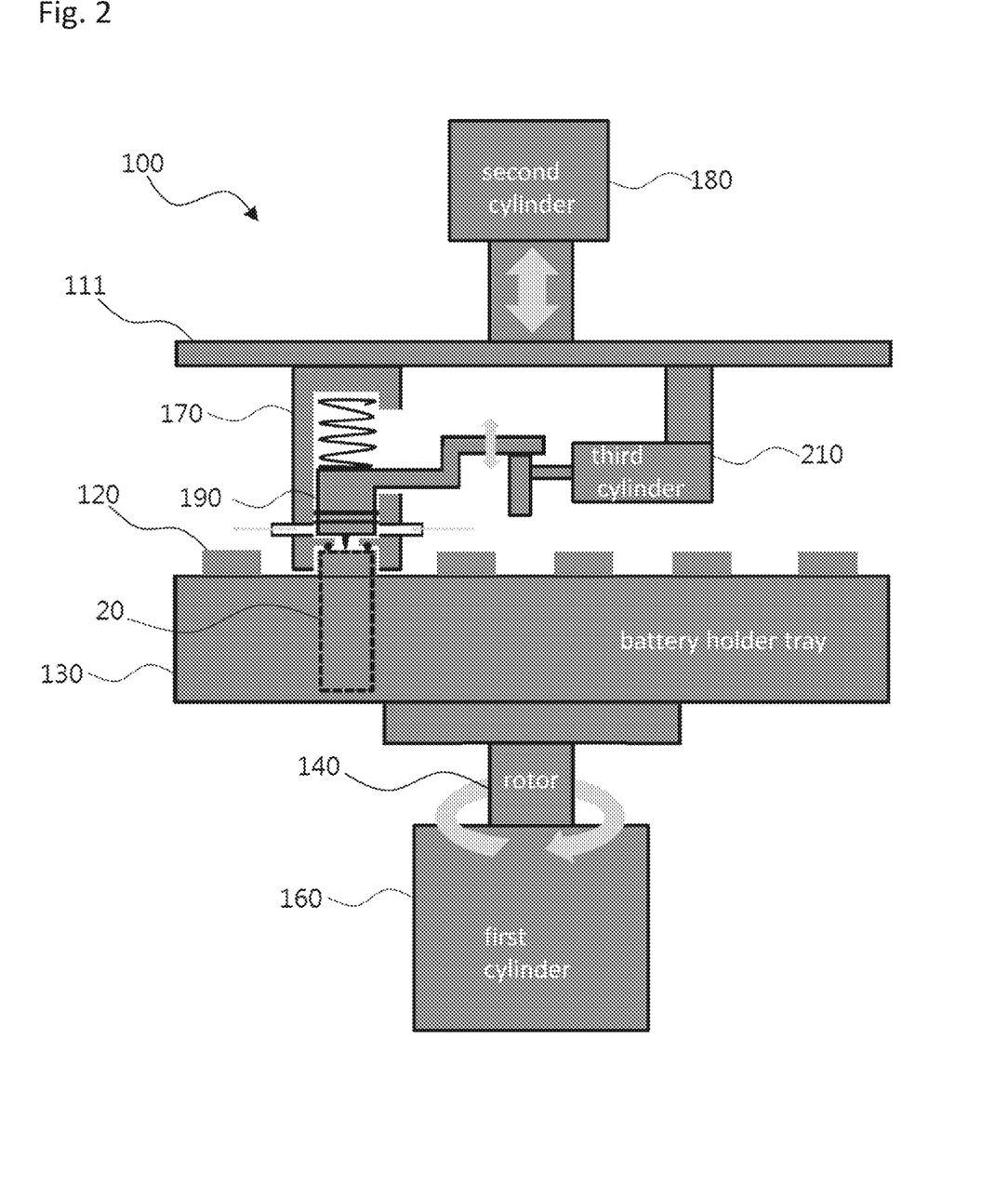
FIG. 2 is a front view of an automated collecting device of gas generated in the secondary battery according to an embodiment of the present invention.
Figure 3:
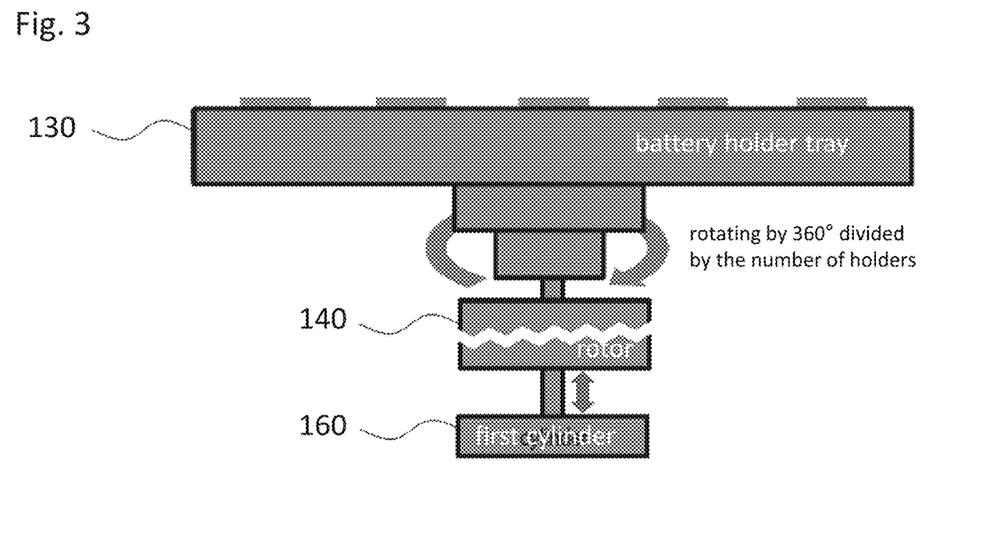
FIG. 3 is a front view showing a holder tray.
Figure 4:
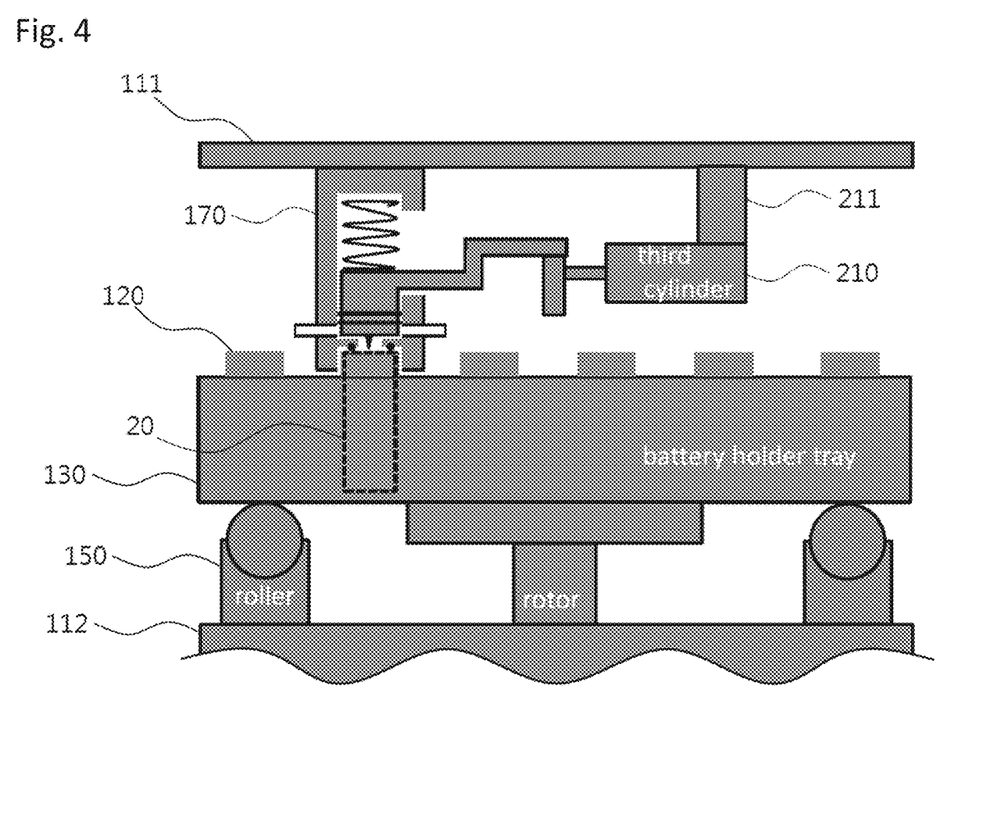
FIG. 4 is a front view of an automated collecting device of gas generated in the secondary battery according to another embodiment of the present invention.
Figure 5:
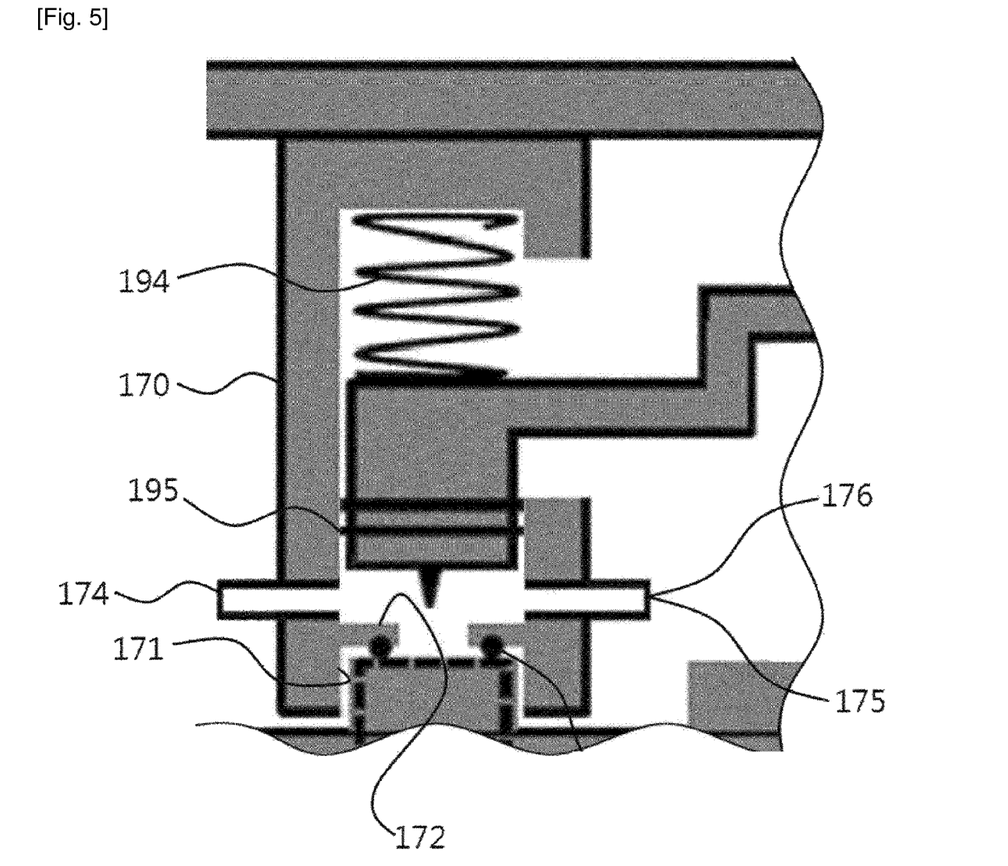
FIG. 5 is a front view showing a punching unit.
Figure 6:
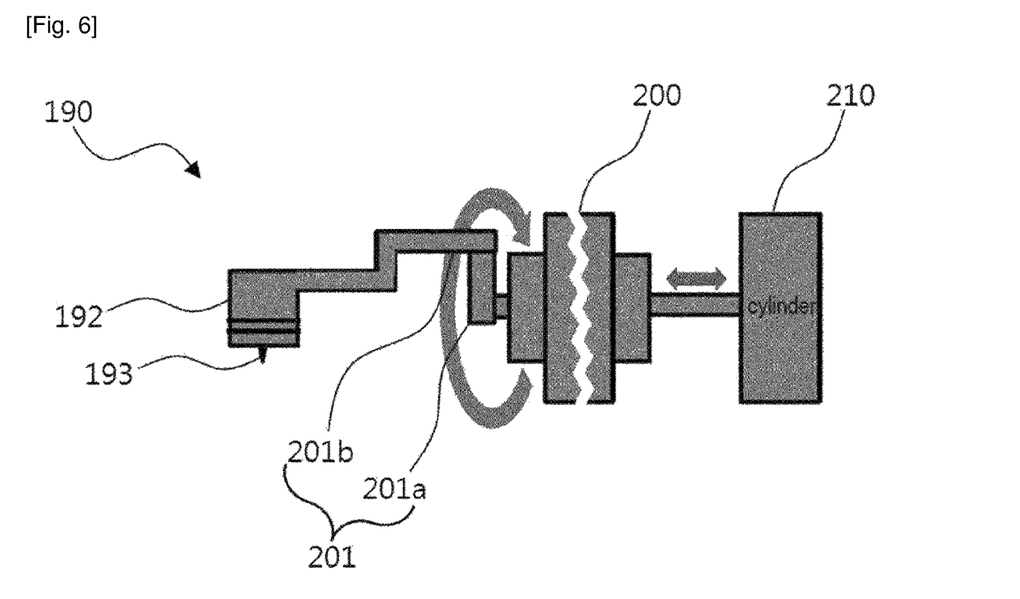
FIG. 6 is a front view showing a punching unit and a crank.

FIG. 2 is a front view of an automated collecting device of gas generated in the secondary battery according to an embodiment of the present invention. FIG. 3 is a front view showing a holder tray. FIG. 4 is a front view of an automated collecting device of gas generated in the secondary battery according to another embodiment of the present invention. FIG. 5 is a front view showing a punching unit. FIG. 6 is a front view showing a punching unit and a crank. FIGS. 7(a) to (c) illustrate a method of operating the automated collecting device of gas generated in the secondary battery according to FIG. 2, respectively.

First, the automated collecting device 100 of gas generated in the secondary battery according to an embodiment of the present invention may be connected to a manifold part 10 of FIG. 1 and analyzed through a gas analysis device 13. Alternatively, the automated collecting device 100 of gas generated in the secondary battery according to one embodiment of the present invention may be directly connected to the gas analysis device without connecting to the manifold part 10. According to this automated collecting device 100 of gas generated in the secondary battery according to one embodiment of the present invention, the device can be directly connected to the gas analysis device to analyze the gas generated from the plurality of batteries in real time, respectively, without collecting the gas in the manifold part 10. Therefore, there is an advantage that it is possible to analyze immediately without dilution of a sample.

The automated collecting device of the gas generated in the secondary battery comprises a plurality of battery holders, each of which is mounted with each of a plurality of secondary batteries 20; a battery holder tray 130 in which the plurality of battery holders are placed; a collecting unit 170 for coupling to and decoupling from one surface of the secondary battery 20 to be analyzed by moving in a direction perpendicular to the one surface of the secondary battery 20 to be analyzed among the plurality of secondary batteries 20; and a punching unit 190 for punching the one side of the secondary battery 20 fixed to the collecting unit 170 by moving in a direction perpendicular to the one surface of the secondary battery 20 to be analyzed in the collecting unit 170.

Referring to FIG. 2, components in the automated collecting device 100 of gas generated in the secondary battery according to the present invention are mounted in a housing (not shown). The housing has a multi-layered structure, in which each layer may be equipped with components. The housing may be formed of, for example, a multilayer structure of a first layer portion 111 and a second layer portion 112, and may include an upper surface portion (not shown) and a lower surface portion (not shown). The first layer portion 111 may be positioned below the upper surface portion of the housing and the second layer portion 112 may be positioned below the first layer portion 111, and the lower surface portion may be provided on the bottom of the housing.

Configuration of the multilayer structure of the housing of the present invention is not limited to the above-described, and various modifications and changes may be made depending on the change of arrangement of the each component of the automated collecting device 100 of gas generated in the secondary battery of the present invention to be described later.

A plurality of battery holders 120 in which a plurality of batteries 20 are placed and a battery holder tray 130 on which the plurality of battery holders 120 is mounted, are provided at center of the housing, for example, between the first layer portion 111 and a second layer portion 112. The upper surface of the battery holder 120 may be provided with a recess (not shown) so that the battery 20 can be mounted and the shape of the recess may correspond to the shape of the battery 20 so that the mounted battery 20 is not separated.

As shown in FIG. 3, a rotor 140 is connected to the center of a lower surface of the battery holder tray 130 and a first cylinder 160 is connected to a lower end of the rotor 140. The rotor 140 may rotate with rotational power of the first cylinder 160, and thus the battery holder tray 130 may rotate accordingly. In addition, the lower end of the first cylinder 160 may be fixed to the housing.

As shown in FIG. 4, at least one roller 150 is positioned on a lower surface of the battery holder tray 130. The lower surface of the battery holder tray 130 may contact the upper surface of the roller 150. Accordingly, when the battery holder tray 130 is rotated by the rotor 140, the battery holder tray 130 may be more smoothly rotated by the roller 150. In addition, the lower surface of the roller 150 may be fixed to the housing, for example, to the second layer portion 112. Accordingly, the roller 150 also serves to support the battery holder tray 130 and to keep the battery holder tray 130 horizontal. In addition, when the collecting unit 170 to be described later punches the battery 20, the alignment of the tray 130 may be distorted or the tray 130 may be inclined. Therefore, at least one roller 150 should be positioned in a straight line in the vertical direction with the collecting unit 170, and thus it is possible to hold the overall alignment including the tray 130 when punching the battery. The roller 150 may be provided in one, but more preferably provided in plural. For example, three rollers 150 may be provided, and the surface of the battery holder tray 130 may be stably supported by three-point support.

The collecting unit 170 for collecting the inner gas generated in the secondary battery may be positioned over the battery holder tray 130. The collecting unit 170 according to the present invention does not accommodate the battery 20 therein, but is coupled to the upper surface of the battery 20 to seal the upper surface of the battery 20 and collect the gas generated in the battery 20. The battery 20 may be, for example, cylinder type battery, a square type battery, a coin cell battery or a pouch type battery.

The collecting unit 170 may be moved up and down by a second cylinder 180, and thus may be coupled to and decoupled from the upper surface of the battery 20 accordingly. Alternatively, in another embodiment, the collecting unit 170 may be moved left and right by the second cylinder 180 and thus may be coupled to and decoupled from the lateral side of the battery 20 accordingly. The second cylinder 180 is to provide linear power to the collecting unit 170 so that the collecting unit 170 can be moved linearly. More specifically, for example, the collecting unit 170 may be mounted on the lower surface of the first layer portion 111 of the housing and the second cylinder 180 may be connected to the upper surface of the first layer portion 111. Accordingly, when the first layer portion 111 is moved up and down by a power of vertical movement of the second cylinder 180, the collecting unit 170 mounted on the lower surface of the first layer portion 111 may be moved up and down. An upper surface of the battery 20 may refer to one surface of the battery 20 that faces the collecting unit 170 among the surfaces of the battery 20.

That is, the collecting unit 170 may be positioned over the battery holder tray 130, and the battery 20 or the battery holder 120 may be positioned between the collecting unit 170 and the battery holder tray 130. The collecting unit 170 may approach or be spaced apart from the battery 20 by receiving power for linear movement from the second cylinder 180 provided over the collecting unit. The battery holder tray 130 may be rotated with a longitudinal axis extending from the upper portion to the lower portion by receiving rotational power from the first cylinder 160 provided below the battery holder tray 130. The plurality of battery holders 120 equipped with the secondary batteries 20 may be disposed at the same distance from the rotation center of the battery holder tray 130. That is, the battery holder 120 may be disposed along the circumference of the virtual circle whose center is the rotation center of the battery holder tray 130. The battery holder 120 may be spaced apart at equal intervals on the circumference of the virtual circle. Therefore, the amount of rotation of the first cylinder 160 may be 360° divided by the number of battery holders 120 provided on the battery holder tray 130. The battery holder 120 may be radially symmetrically disposed on the battery holder tray 130 at a constant interval. Each time the first cylinder 160 rotates once, each of batteries may be sequentially positioned below the collecting unit 170.

As shown in FIG. 5, the collecting unit 170 includes a battery holder accommodating unit 171 at a lower end of the collecting unit 170. The inner space of the battery holder accommodating unit 171 may have a shape that matches the shape of the battery holder 120 to accommodate the battery holder 120.

In addition, the collecting unit 170 includes an accommodating unit 172 of gas generated in the battery 20 for accommodating battery holder in its inner space. The accommodating unit 172 of gas generated in the battery is positioned over the battery holder accommodating unit 171 and has a columnar shape and an empty inner space, in which a punching unit rod 192 and a punching needle 193 of the punching unit 190 to be described later can be moved up and down. The battery holder accommodating unit 171 and the accommodating unit 172 of gas generated in the battery are integrally formed. As described above, when the collecting unit 170 moves downward by the second cylinder 180, the battery holder 120 may be accommodated in the battery holder accommodating unit 171 and the upper surface of the battery 20 may be coupled to the lower end of the accommodating unit 172 of gas generated in the battery. A sealing member 173 is provided on the circumference of the lower end of the accommodating unit 172 of gas generated in the battery (where the battery holder accommodating unit 171 is contact with the upper surface of the battery 20) to seal the accommodating unit 172 of gas generated in the battery and the upper surface of the battery 20. The sealing member 173 may be, for example, an O-ring.

An outlet 174 of gas generated in the battery is provided at a lateral side of the accommodating unit 172 of gas generated in the battery and adjusted to move the inner gas generated in the battery which is released through the accommodating unit 172 of gas generated in the battery from the upper surface of the battery 20 to a manifold 10. The outlet 174 of gas generated in the battery may be equipped with an on-off valve (not shown).

In addition, a lateral side of the accommodating unit 172 of gas generated in the battery is provided with a vacuum pump connecting part 175 to which a vacuum pump 11 is connected to adjust an interior of the accommodating unit 172 of gas generated in the battery to a vacuum state, and a nitrogen gas connecting part 176 for supplying nitrogen gas into the accommodating unit 172 of gas generated in the battery. The drawings of the present invention shows a case in which the vacuum pump connecting part 175 and the nitrogen gas connecting part 176 are used in common. In other words, an on-off valve is provided on the lateral side of the accommodating unit 172 of gas generated in the battery, so that a vacuum pump (not shown) is connected to one opening (175, 176) to adjust an interior of the accommodating unit 172 of gas generated in the battery to a vacuum state and a nitrogen gas supplying part (not shown) is connected to the one opening (175, 176) to supply nitrogen gas to the accommodating unit 172 of gas generated in the battery. Alternatively, a T-type connector (not shown) is connected to one opening (175, 176) on the lateral side of the accommodating unit 172 of gas generated in the battery so that the vacuum pump and the nitrogen gas supplying part are connected to the T-type connector, respectively. Alternatively, unlike the drawings, various modifications and changes are possible, such as the lateral side of the accommodating unit 172 of gas generated in the battery may be provided with a vacuum pump connecting part 175 and a nitrogen gas connecting part 176, respectively as two openings. Each of the vacuum pump connecting part 175 and the nitrogen gas connecting part 176 may be equipped with an on-off valve (not shown).

The collecting unit 170 is also provided with a punching unit 190 for punching the upper surface of the battery 20. As shown in FIG. 6, the punching unit 190 may move up and down by a crank 200. The third cylinder 210 rotates to allow the crank 200 connected to the third cylinder 210 to be rotated. By rotation of the crank 200, the punching unit 190 connected to the crank through the connecting rod 201 is moved vertically (up and down). That is, the rotational power of the third cylinder 210 by the crank 200 may be converted into the linear power for reciprocating the punching unit 190 up and down. More specifically, the connecting rod 201 may be roughly composed of a first portion 201a connected to the crank 200 and a second portion 201b connected to the punching unit 190. The first portion 201a may be an elliptic or circular disk. The rotation axis of the crank 200 may be connected to be perpendicular to the surface of the first portion 201a, and may be connected to be spaced apart from the center of the first portion 201a. One end of the second portion 201b is fixed to the punching unit 190, and the other end of the second portion 201b may slide in contact with the circumference of the first portion 201a. As the first portion 201a of the connecting rod 201 fixed to the crank 200 rotates, the second portion 201b of the connecting rod 201 is pushed out so that the punching unit 190 moves linearly to punch a hole in the battery 20. In some cases, the first portion 201a and the second portion 201b of the connecting rod 201 may be integrally formed. FIGS. 7(a) and 7(c) show a case where the punching unit 190 is raised, and FIG. 7(b) shows a case where the punching unit 190 is lowered.

For example, the third cylinder 210 may be supported on the lower surface of the first layer portion 111 through the third cylinder fixing member 211.

Figure 7:
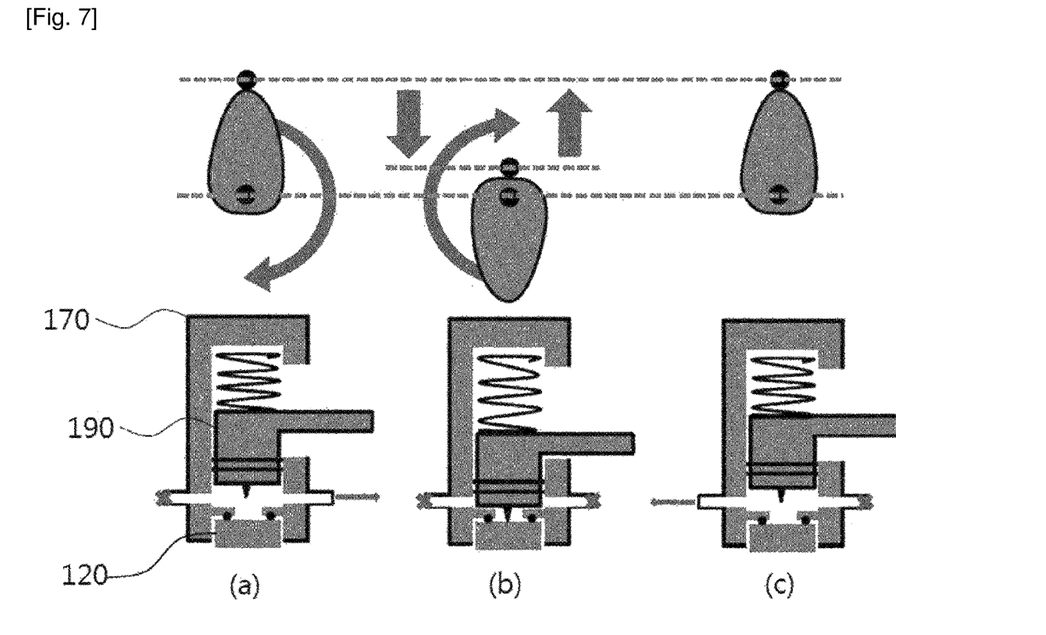
FIGS. 7(a) to (c) illustrate a method of operating the automated collecting device of gas generated in the secondary battery according to FIG. 2, respectively.

More specifically, as shown in FIG. 7, the punching unit rod 192 of the punching unit 190 is connected to the connecting rod 201 of the crank 200. The punching needle 193 is connected to the lower end of the punching unit rod 192, so that the punching needle 193 is moved up and down by the up and down movement of the punching unit rod 192 due to the rotation of the crank 200. In addition, the punching unit rod 192 and the punching needle 193 may be moved through the inside of the accommodating unit 172 of gas generated in the battery so that the punching needle 193 can be moved to the upper surface of the battery 20. Accordingly, when the punching unit 190 moves downward to the upper surface of the battery 20 and the upper surface of the battery 20 is punched with the punching needle 193 and then the punching unit 190 moves upward, the inner gas generated in the battery 20 moves from the hole on the upper surface of the battery 20 into the accommodating unit 172 of gas generated in the battery. The circumstance of the punching unit rod 192 is provided with a sealing member 195, such as an O-ring so that the inner gas generated in the battery 20 does not move to the spring 194 connected to the punching unit rod 192. The sealing member 195 of the punching unit rod 192 may be provided in plural. The plurality of sealing members 195 of the punching rods 192 may be disposed to be spaced apart from each other by a certain distance along the longitudinal direction of the punching unit rod 195. The accommodating unit 172 of gas generated in the battery may have a closed space that is blocked by the sealing member 195 around the punching unit rod 192 and the sealing member 173 contacting the upper surface of the battery 20 from the outside. That is, the sealing members 173 and 195 at two positions may prevent the gas from leaking to the outside and allow the gas to be collected in the accommodating unit 172 of gas generated in the battery.

A spring 194 is connected to the upper end of the punching unit rod 192, so that the punching needle 193 can be rapidly moved downward by a restoring force of the spring 194 which is contracted when the crank 200 rotates to move the punching needle 193 downward. Accordingly, the upper surface of the battery 20 can be punched by the punching needle 193 instantaneously. In addition, it is possible to limit vertical movement distance of the punching needle (193) by the spring 194.

Next, referring to FIG. 7, a method of operating the automated collecting device 100 of gas generated in the secondary battery of FIG. 2 will be described.

First, a step of rotating the battery holder tray 130 to place the battery 20 to be analyzed below the collecting unit 170 is performed. That is, the battery 20 to be analyzed is properly positioned below the collecting unit 170 by rotating the battery holder tray 130.

Next, a step of coupling the collecting unit 170 to the upper surface of the battery 20 by moving downward by the second cylinder 180 is performed. That is, the collecting unit 170 is moved downward by the second cylinder 180 to be accurately fixed to the upper surface of the battery 20, and the upper surface of the battery 20 is sealed by the sealing member 173.

Next, a step of adjusting an interior of the accommodating unit 172 of gas generated in the battery to a vacuum state (FIG. 7(a)) is performed. That is, the on-off valve of the vacuum pump connecting part 175 to which the vacuum pump 11 is connected is opened to adjust an interior of the accommodating unit 172 of gas generated in the battery to a vacuum state. In this case, the punching unit 190 may be elevated.

Next, a step of punching the upper surface of the battery 20 by moving the punching needle 193 downward by rotating the crank 200 (FIG. 7(b)) is performed. That is, as the crank 200 rotates by the third cylinder 210, the punching needle 193 is rapidly moved downward to punch the upper surface of the battery 20 strongly together with a force of the spring 194. At this time, the restoring force of the spring 194 which is contracted with the rotation of the crank 200 is added, so that the punching needle 193 can be moved downward rapidly. In the punching step, all of the valves of outlet 174 of gas generated in the battery, the vacuum pump connecting part 175, and the nitrogen gas connecting part 176 may be closed.

Next, a step of collecting the inner gas generated gas in the battery 20 (FIG. 7(c)) is performed. That is, as the crank 200 rotates, the punching needle 193 moves upward and returns to its original state. At this time, since the spring 194 is contracted, the speed at which the punching needle 193 moves upward is slower than the speed at which punching needle 193 moves downward. When the punching needle 193 moves upward, the inner gas generated in the battery 20 is moved from the punched hole on the upper surface of the battery 20 into the accommodating unit 172 of gas generated in the battery and collected through the outlet 174 of gas generated in the battery.

Next, a step of separating the battery 20 from the collecting unit 170 by injecting nitrogen gas is performed. That is, when the collection of the inner gas generated in the battery 20 is completed, the on-off valve of the nitrogen gas connecting part 176 is opened to inject nitrogen gas into the accommodating unit 172 of gas generated in the battery. As a result, the battery 20 that is in close contact with the sealing member 173 is separated.

Next, a step of moving the collecting unit 170 upward by the second cylinder 180 and positioning a secondary battery 20 to be analyzed next below the collecting unit 170 is performed. That is, after the collecting unit 170 is moved upward by the second cylinder 180, the battery holder tray 130 is rotated so that the battery 20 to be analyzed next is positioned right below the collecting unit 170. The same process is performed as described above with respect to the battery 20 to be analyzed next.

The above-described embodiment is just a preferred embodiment to enable those skilled in the art to which the present invention pertains (hereinafter, referred to as a person skilled in the art) to easily carry out the present invention. Since the present invention is not limited to the above-described embodiment and the accompanying drawings, the scope of the present invention is not limited thereto. Therefore, it will be apparent to those skilled in the art that various substitutions, modifications, and changes can be made without departing from the spirit of the present invention, and it is obvious that parts easily changed by those skilled in the art are included in the scope of the present invention.

INDUSTRIAL APPLICABILITY

According to the present invention, even with one automated collecting device of gas generated in a secondary battery, there is an advantage that it is possible to collect and analyze more efficiently, simply and quickly, in collecting the gas generated from the plurality of secondary batteries and analyzing the gas in real time.

What is claimed is:

1. An automated gas-collecting device, comprising:
a plurality of battery holders, each holder being configured to hold a corresponding secondary battery mounted therein;
a battery holder tray configured to support the plurality of battery holders;
a collecting unit configured to removeably affix to a surface of a secondary battery mounted in one of the plurality of battery holders by moving in a direction perpendicular to the surface of the secondary battery;
a punching unit configured to punch a side of the secondary battery affixed to the collecting unit by moving in a direction perpendicular to the surface of the secondary battery;
a second cylinder connected to the collecting unit and configured to provide power for linear movement of the collecting unit;
a rotor connected to the battery holder tray to rotate the battery holder tray;
a first cylinder connected to the rotor and configured to provide rotational power to the rotor;
a crank connected to the punching unit; and
a third cylinder connected to the crank and configured to provide rotational power to the crank,
wherein the battery holder tray is configured to rotate to position the surface of the secondary battery facing the collecting unit
wherein the crank is configured to convert the rotational power of the third cylinder into power for linear movement of the punching unit.

2. The automated gas-collecting device according to claim 1, wherein the collecting unit is positioned over the battery holder tray, and the secondary battery or the battery holder is positioned between the collecting unit and the battery holder tray.

3. The automated gas-collecting device of gas generated in a secondary battery according to claim 2, wherein the collecting unit comprises:
a battery holder accommodating unit positioned at a lower end of the collecting unit, the battery holder accommodating unit having a first inner space configured to accommodate the battery holder;
a gas accommodating unit integrally formed with the battery holder accommodating unit and positioned over the battery holder accommodating unit, wherein the gas accommodating unit has a columnar shape, and having a second inner space configured to accommodate gas generated in the secondary battery;
a sealing member provided at a portion where the battery holder accommodating unit and the surface of the secondary battery contact each other, the sealing member configured to seal a space formed by the gas accommodating unit and the surface of the secondary battery;
a gas outlet positioned at a lateral side of the gas accommodating unit, wherein the gas outlet is adjustable to move the gas generated in the secondary battery which is released through the gas accommodating unit from the surface of the secondary battery to a manifold part or a gas analyzer; and
a vacuum pump connecting part positioned at a lateral side of the gas accommodating unit and configured to connect to a vacuum pump.

4. The automated gas-collecting device according to claim 3, wherein the punching unit comprises:
a punching unit rod connected to the crank; and
a punching needle connected to a lower end of the punching unit rod,
wherein the punching needle is configured to:
move through the gas accommodating unit by movement of the punching unit rod due to rotation of the crank; and
punch the surface of the secondary battery.

5. The automated gas-collecting device according to claim 4, wherein the punching unit further comprises a spring connected to an upper end of the punching unit rod, wherein when the crank rotates to move the punching needle downward, the surface of the secondary battery is punched by movement of the punching needle at a high speed with a restoring force of the contracted spring.

6. The automated gas-collecting device according to claim 1, wherein the secondary battery is any one of a cylinder type battery, a square type battery, a coin cell battery and a pouch type battery.

7. The automated gas-collecting device according to claim 3, wherein the collecting unit further comprises a nitrogen gas connecting part positioned at a lateral side of the gas accommodating unit and is configured to connect a nitrogen gas supplying part.

8. The automated gas-collecting device according to claim 1, wherein when collection of the gas generated in the secondary battery is completed, the collecting unit is configured to be spaced apart from the surface of the secondary battery to decouple from the surface of the secondary battery, and the battery holder tray is configured to rotate to position a surface of a next secondary battery facing the collecting unit.

9. A method performed by an automated gas-collecting device comprising:
- a plurality of battery holders, each holder being configured to hold a corresponding secondary battery mounted therein;
- a battery holder tray configured to support the plurality of battery holders;
- a collecting unit configured to removeably affix to a surface of a secondary battery mounted in one of the plurality of battery holders by moving in a direction perpendicular to the surface of the secondary battery; and
- a punching unit configured to punch a side of the secondary battery affixed to the collecting unit by moving in a direction perpendicular to the surface of the secondary battery, wherein the method comprises:
- rotating the battery holder tray to position the secondary battery facing the collecting unit;
- affixing the collecting unit to the surface of the secondary battery;
- adjusting an interior of the collecting unit to a vacuum state;
- punching the surface of the secondary battery with the punching unit;
- collecting gas generated in the secondary battery;
- separating the secondary battery from the collecting unit by injecting nitrogen gas;
- spacing the collecting unit apart from the secondary battery; and
- moving a next secondary battery to position the next secondary battery facing the collecting unit.

10. A method, performed by an automated gas-collecting device comprising:
- a plurality of battery holders, each holder being configured to hold a corresponding secondary battery mounted therein;
- a battery holder tray configured to support the plurality of battery holders;
- a collecting unit configured to removeably affix to a surface of a secondary battery mounted in one of the plurality of battery holders by moving in a direction perpendicular to the surface of the secondary battery; and a punching unit configured to punch a side of the secondary battery affixed to the collecting unit by moving in a direction perpendicular to the surface of the secondary battery, the method comprising:
- rotating the battery holder tray by a rotor connected to a first cylinder to position the secondary battery facing the collecting unit using rotational power provided by the first cylinder;
- moving the collecting unit toward the surface of the secondary battery using linear power provided by a second cylinder;
- adjusting an interior of the collecting unit to a vacuum state;
- punching the surface of the secondary battery with the punching unit by linearly moving the punching unit by a crank connected to a third cylinder using rotational power provided by the third cylinder;
- collecting gas generated in the secondary battery;
- separating the secondary battery from the collecting unit by injecting nitrogen gas;
- spacing the collecting unit apart from the secondary battery using linear power provided by the second cylinder; and
- rotating the battery holder tray by the rotor to position a next secondary battery facing the collecting unit.

* * * * *